Patented Mar. 11, 1941

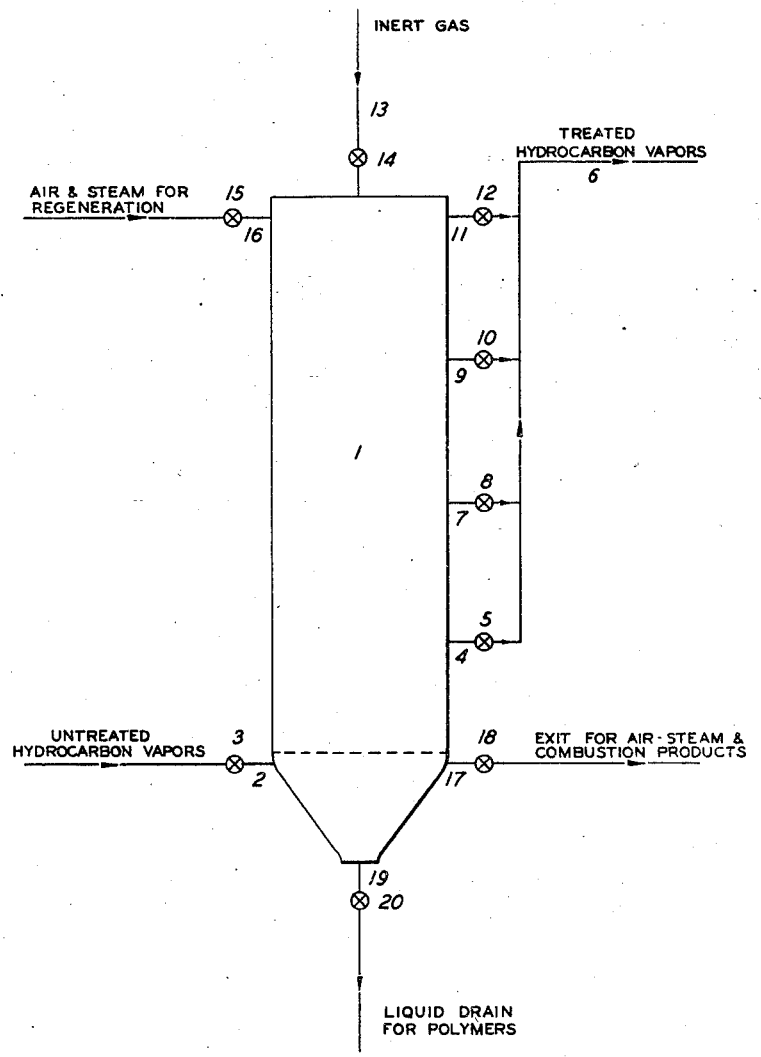

2,234,505

UNITED STATES PATENT OFFICE 2,234,505

METHOD FOR TREATING VAPORS

Walter A. Schulze, Bartlesville, Okla., assignor to Phillips Petroleum Company, a corporation of Delaware Original application October 6, 1936, Serial No. 104,303. Divided and this application January 3, 1939, Serial No. 249,145

4 Claims. (Cl. 196—28)

This invention relates to the art of treating hydrocarbons in the vapor form with solid content catalysts and relates more particularly to the treatment of the lower boiling distillates produced by cracking heavier hydrocarbon oil mixtures and to vapor recovery and polymerized gasoline stocks though the process is also applicable to the treatment of similar distillates produced in the straight run distillation of petroleums, to natural gasolines, and to other hydrocarbon materials. It relates also to a convenient and efficient apparatus for carrying out the reaction. The process, however, is not limited to the particular apparatus shown as certain features of the process have more general application.

In a more specific sense the invention has reference to a process for treating such motor fuel stocks to reduce their sulfur content, improve their antiknock characteristics and produce other desirable refining effects.

This application is a division of my copending application Serial No. 104,303, filed October 6, 1936.

Many processes have been suggested heretofore for improving motor fuel stocks by contact with catalysts. In all of these processes, however, the catalyst becomes poisoned after a time by certain bodies either present in the vapors or formed by reaction between the catalyst and the hydrocarbon vapors and/or impurities in the vapors. I have found that the rate of poisoning of these catalysts varies greatly with the various gasoline stocks, some of them reducing the catalyst activity to an uneconomic level within a period of several hours or less. Highly cracked gasolines and pressure distillates, polymerized gasoline stocks and vapor recovery gasolines are especially bad in this connection.

An object of my invention is a process for treating these petroleum vapors which rapidly poison contact catalysts, such vapors being referred to herein under the general term of cracked gasoline stocks, under such conditions that the gasoline produced therefrom has improved antiknock characteristics, a lowered sulfur content and other improved qualities.

Another object of my invention is a process for treating these cracked gasoline stocks in an efficient and highly economical manner, one that can be applied commercially to such motor fuel stocks.

I have discovered that the poisoning of contact catalysts during the treatment of these hydrocarbon vapors results from three distinct sources, namely (1) from the high boiling constituents in the vapors and the polymerization products and tar-like bodies which are formed almost instantaneously from certain "extremely unstable constituents" in the vapors, (2) from the products of cracking and/or polymerization of those constituents referred to herein as "less reactive hydrocarbons," and (3) from the carbonaceous residues resulting from the decomposition of certain of the impurities, e. g. some of the organic sulfur compounds, in the vapors.

The rate of poisoning of the catalyst from the first source varies greatly from stock-to stock and from one refinery to another. The amount of "extremely unstable constituents" in the vapors is generally greater in the case of those gasoline stocks produced by extensive cracking at high temperatures than in those produced under milder conditions. Acetylenes, diolefines, cyclopentadiene and its homologues are examples of these "extremely unstable constituents" which polymerize almost instantaneously when brought into contact at elevated temperatures with those catalysts for desulfurization and for improving antiknock characteristics. The poisoning of the catalyst by this means depends principally on the amount of cracked gasoline treated per volume of the catalyst and is almost independent of the rate of treatment. Preliminary treatment of the vapors for the removal of these constituents decreases or prevents poisoning of the catalyst from this source.

I have found that the rate of poisoning of the catalyst from the second source mentioned above is substantially independent of the amount of gasoline treated per volume of the catalyst. The extent of poisoning is a function of the time the hydrocarbon vapors are in contact with the catalyst at the elevated temperatures and, of course, a function of the concentration (pressure) of the hydrocarbons. In other words, the cracking and/or polymerization of those constituents termed "less reactive hydrocarbons" proceeds at a rate many times slower than those reactions listed under the first source. I have found that I can take advantage of this comparatively slow rate of poisoning from cracking and/or polymerization of the "less reactive hydrocarbons" by employing very high flow rates of the cracked gasoline vapors at comparatively low pressures over these contact catalysts, thereby obtaining a large throughput of gasoline per ton of catalyst before the activity has had a chance to decrease to an uneconomic level. It is, therefore, an object of my invention to treat cracked gasoline vapors at very high flow rates over contact catalysts to lower the sulfur content, improve the antiknock characteristics and produce other desirable refining effects.

The poisoning of the catalyst from the third source mentioned above is a function of the amount and kind of impurities present in the vapors being treated. In most instances the catalysts, particularly sulfactive catalysts, lose their activity very slowly as a result of the carbonaceous residues deposited by the decomposition of certain of the sulfur and other compounds. In the treatment of cracked gasoline vapors, therefore, only the first two sources of poisoning need be considered.

I have discovered furthermore that the decomposition of the deleterious organic sulfur compounds over contact catalysts of high activity is extremely rapid and that complete decomposition of these compounds can be obtained when operating at extremely short contact times. I have found it possible, therefore, to treat cracked gasoline vapors while at approximately atmospheric pressure at flow rates of the order of 3 to 50 liquid volumes per hour per volume of catalyst without seemingly reaching the maximum. I have found also that when treating for example one thousand barrels of gasoline per ton of catalyst the average improvement in antiknock characteristics and the average reduction in sulfur content are much greater when treating at these high flow rates than those obtained when treating at lower flow rates.

Pressures below 100 pounds are usually preferred inasmuch as at these pressures the decomposition of sulfur compounds is complete at lower temperature levels. At superatmospheric pressures, still greater throughput may be had at equivalent contact time but due to the higher concentration of hydrocarbons the catalyst activity decreases at a faster rate.

This invention is thus of broad applicability and more or less independent of the particular catalytic reaction and the particular catalyst. It is a method of treating cracked hydrocarbon vapors over contact catalysts in such a way that high throughputs can be obtained before the activity of the catalyst has decreased to the uneconomic level. In most instances, the catalysts will of course be regenerated. Such regeneration may be by burning out in situ with a mixture of steam and air or by removing from the catalyst chamber and burning in any conventional manner.

While the process is of general applicability wherever a catalyst is used with vapors of this nature, it is particularly beneficial when used in connection with bauxite and the like whose action at temperatures of 500–750° F. is to convert the organic sulfur compounds which are especially deleterious to the octane number and lead response of the motor fuel to hydrogen sulfide which may be subsequently removed, and whose further action at higher temperatures is to cause changes in the hydrocarbon constituents and greatly increase the octane number. This invention does not relate to the discovery of the action of the bauxite and the like, but to the particular measure of treating these cracked gasoline vapors over the bauxite. This process is beneficial, too, when used in connection with adsorbent catalytic materials of the clay type and with metallic sulfides and oxides whose action is considered in connection with improvement in quality of the cracked gasoline vapors for use in motor fuels.

The invention is illustrated by reference to the drawing, which shows in schematic form an apparatus for efficient application of this invention when a catalyst such as bauxite is to be operated at relatively high temperature.

In the drawing the cracked gasoline vapors heated to the desired temperature enter near the bottom of the catalyst chamber 1, through the line 2 and the valve 3. The vapors pass upward through the catalyst bed wherein the deleterious organic sulfur compounds are decomposed to hydrogen sulfide and other desirable refining effects take place. During what is termed the "first period" of the treating cycle the treated vapors leave the catalyst through the line 4, the valve 5, and thence through the line 6 to the next step in final processing. All of the other valves are closed during this period.

During this "first period" which, for example, may be six hours more or less, the cracked gasoline vapors come into contact with substantially only that portion of the catalyst lying below the level of the line 4. In order to keep the cracked gasoline vapors from being in contact with the catalyst higher in the chamber and thereby gradually poisoning it by cracking and/or polymerization of the "less reactive hydrocarbons," a slow stream of inert gas such as methane, hydrogen or a mixture of light hydrocarbon gases is injected through the line 13 and the valve 14 into the top of the catalyst chamber. This inert gas leaves the catalyst along with the treated cracked gasoline vapors through the line 4, the valve 5 and the line 6.

During the "first period," therefore, the bottom-most section of the catalyst bed treats the vapors which are passed through at very high flow rates and at relatively low pressures. When the activity of this portion of the catalyst has decreased to the uneconomic level, valve 8 is opened and valve 5 is closed and the system is operated in this manner during the "second period." During this time the bottom-most section of the catalyst bed since it still has some activity aids somewhat in improving the vapors, especially in polymerizing and removing those constituents in the vapors referred to as "extremely unstable constituents" which are almost instantaneously polymerized. Although this first portion of the catalyst may have been poisoned to the extent that very little reduction in sulfur content and improvement in antiknock characteristics would result, it nevertheless is sufficiently active to act as a preliminary treating step for those members belonging in my first class of poisons. The "second period," therefore, is generally somewhat longer than the "first period."

When the second section of the catalyst bed has decreased appreciably in activity, valve 10 is opened and valve 8 is closed, and the system operated in this manner during the "third period." During the "fourth period" valve 12 is opened and valve 10 is closed. Finally when the entire bed is spent the hydrocarbon vapors are switched to a second tower of similar design while the catalyst in this first tower is regenerated. In this manner continuous operation may be had.

Liquid polymers which form and collect in the catalyst bed during the treatment of the hydrocarbon vapors drain to the bottom of the catalyst chamber and may be drawn off intermittently through the line 19 and valve 20.

At the conclusion of the treatment of the hydrocarbon vapors the valves 3, 12 and 14 are closed and 15 and 18 are opened. Steam is then introduced through line 16 into the catalyst chamber 1 and the hydrocarbons and steam exit through line 17 and valve 18. After the volatile material has been removed the carbonaceous residues are burned out of the catalyst by a mixture of superheated steam and air entering through line 16 and exiting through line 17 and valve 18. Following the regeneration the valves 15 and 18 are closed and the tower is again ready for treatment of additional cracked gasoline vapors.

The catalyst chamber should generally be of small diameter as compared with its height so as to keep the vapors more nearly within the proper section during each of the treating periods. Although the drawing indicates the chamber is operated in four sections, it is obvious to those skilled in the art that the design can be extended to any number of sections merely by having either a smaller or a greater number of lines leading out the side of the chamber.

Since the cracked gasoline is treated at extremely high flow rates, the catalyst chambers are generally quite small, when 10 liquid volumes are treated per hour per volume of catalyst, one thousand barrels of gasoline per 24-hour day may be treated in a tower holding only about four barrels of catalyst.

From this disclosure of my invention it is further obvious to those skilled in the art, that instead of the single tower operated in sections as described above, an equivalent number of small towers operated in series would tend to approach the results described above. However, my design has several very important advantages over the series of small towers. In the first place, there is no appreciable drop in temperature when the vapors pass from one section of the bed into the successive section whereas in separate towers even with excellent insulation there would be a substantial drop and a means of adding additional heat would be required. Secondly, the single tower design can be built much more economically than the series of still smaller towers, and this must be kept in mind in all commercial installations. Thirdly, the catalyst bed can be regenerated more inexpensively in this single tower than in a series of smaller units.

The following is a specific example of the operation of my process on one type of cracked gasoline. The example is merely illustrative of the nature of this invention and is not to be taken as a limitation on the invention.

Cracked gasoline vapors from high temperature cracking of Mid-continent fuel oil were passed through a bauxite catalyst at a temperature of 740° F. and a flow rate of ten liquid volumes of gasoline per hour per volume of catalyst. The hydrogen sulfide was removed from the treated product which was then compared with the untreated product also hydrogen sulfide free. The sulfur reduction averaged 0.045 per cent for the first 200 volumes of gasoline treated. The octane rating was increased by an average of 2.5 octane numbers and the lead response was considerably increased.

For comparative purposes, some of the same cracked gasoline vapors were passed over an equivalent amount of the same bauxite catalyst at identical temperature and pressure conditions but at a flow rate of about one liquid volume of gasoline per hour per volume of catalyst. Before 60 volumes had been collected the catalyst activity had decreased to such an extent that further treatment with this catalyst was uneconomical.

Obviously many modifications and variations of the invention, as hereinbefore set forth, may be made without departing from the spirit and the scope thereof, and therefore only such limitations should be imposed as are indicated in the appended claims.

I claim:

1. A method for preventing deterioration of the unused portion of a bed of catalyst having a point at which the vapors to be treated are introduced and spaced points along the same for the withdrawal of the vapors treated comprising, withdrawing the treated vapors from a withdrawal point nearest the point of introduction, subsequently withdrawing the vapor from a withdrawal point further removed from the point of introduction, and in the meantime introducing a gas which is inert under the conditions employed in the catalytic step into the unused portion of the catalyst bed in such a manner that the said inert gas will prevent infiltration of the reactive vapors into the unused portion of the catalyst, thereby preventing deterioration of the catalyst prior to use.

2. A method for preventing deterioration of the unused portion of a bed of catalyst in a chamber equipped with several vapor discharge lines and valves spaced at various intervals along the side of the said chamber, comprising, introducing a gas which is inert under the conditions employed in the catalytic step into the unused portion of the catalyst bed in such manner that the said inert gas will prevent infiltration of the reactive vapors into the unused portion of the catalyst, thereby preventing deterioration of the catalyst prior to expected use.

3. In a method for treating vapors in which the vapors are passed in contact with a catalyst which becomes poisoned with continued use comprising arranging the catalyst in the form of an elongated bed, introducing the vapors to be treated at one end of the bed, withdrawing the treated vapors at an intermediate point in the bed, introducing an inert gas into the unused portion of the bed, and subsequently withdrawing treated vapors from the other end of the bed.

4. In a method for treating vapors in which the vapors are passed in contact with a catalyst which becomes poisoned with continued use comprising arranging the catalyst in the form of an elongated bed, introducing the vapors to be treated at one end of the bed, withdrawing the treated vapors at an intermediate point in the bed, introducing an inert gas at the other end of the bed, and subsequently withdrawing treated vapors from the bed at said other end.

WALTER A. SCHULZE.

CERTIFICATE OF CORRECTION.

Patent No. 2,234,505.  March 11, 1941.

WALTER A. SCHULZE.

It is hereby certified that error appears in the printed specification of the above numbered patent requiring correction as follows: Page 1, first column, lines 2 and 3, for the word "content" read --contact--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.